United States Patent
Mueller et al.

(10) Patent No.: US 9,352,842 B2
(45) Date of Patent: May 31, 2016

(54) WIRELESS NETWORK FOR CONTROLLING THE OXYGEN SYSTEM OF AN AIRCRAFT

(71) Applicant: Airbus Operations GmbH, Hamburg (DE)

(72) Inventors: Jan Mueller, Hamburg (DE); Frank Leuenberger, Hamburg (DE); Heiko Trusch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/244,093

(22) Filed: Apr. 3, 2014

(65) Prior Publication Data

US 2014/0309811 A1   Oct. 16, 2014

Related U.S. Application Data (63) Continuation of application No. PCT/EP2012/004188, filed on Oct. 5, 2012.

(60) Provisional application No. 61/543,346, filed on Oct. 5, 2011.

(30) Foreign Application Priority Data

Oct. 5, 2011  (DE) .......................... 10 2011 114 957

(51) Int. Cl.
B64D 25/00   (2006.01)
(52) U.S. Cl.
CPC ............ B64D 25/00 (2013.01); *B64D 2231/00* (2013.01)

(58) Field of Classification Search
USPC ...................... 701/1–3, 14, 36; 340/945, 963; 244/118.5, 117 R
See application file for complete search history.

(56) References Cited

U.S. PATENT DOCUMENTS

| | | | |
|---|---|---|---|
| 5,614,896 A * | 3/1997 | Monk et al. .................... | 340/945 |
| 2003/0196707 A1 | 10/2003 | Meckes et al. | |
| 2005/0061915 A1 * | 3/2005 | Vogt et al. ................... | 244/118.5 |
| 2009/0139519 A1 | 6/2009 | Deutscher et al. | |
| 2010/0078019 A1 | 4/2010 | Rittner et al. | |
| 2012/0205491 A1 * | 8/2012 | Rittner et al. ............... | 244/118.5 |

FOREIGN PATENT DOCUMENTS

| | | |
|---|---|---|
| DE | 10217499 | 7/2003 |
| DE | 102006039181 | 12/2007 |
| DE | 102009009189 | 8/2010 |
| WO | 2007140948 | 12/2007 |
| WO | 2010092152 | 8/2010 |

OTHER PUBLICATIONS

International Search Report, Jan. 22, 2013.

\* cited by examiner

*Primary Examiner* — Yonel Beaulieu
(74) *Attorney, Agent, or Firm* — Greer, Burns & Crain Ltd.

(57) ABSTRACT

A control device for activating an oxygen system of a transport mechanism, in particular an aircraft, a control system having such a control device, an associated method for activating an oxygen system of a transport mechanism, in particular an aircraft, and a computer program for carrying out the method. Furthermore, a network is provided for a transport mechanism, in particular for an aircraft. The control device for activating the oxygen system comprises a first activation unit which is configured to activate at least a part of the oxygen system by wireless transmission of a first activation signal.

15 Claims, 6 Drawing Sheets

WIRELESS NETWORK FOR CONTROLLING THE OXYGEN SYSTEM OF AN AIRCRAFT

CROSS-REFERENCES TO RELATED APPLICATIONS

This application is a continuation of International Application PCT/EP2012/004188 filed Oct. 5, 2012, designating the United States and published on Apr. 11, 2013 as WO 2013/050174. This application also claims the benefit of the U.S. Provisional Application No. 61/543,346, filed on Oct. 5, 2011, and of the German patent application No. 10 2011 114 957.4 filed on Oct. 5, 2011, the entire disclosures of which are incorporated herein by way of reference.

BACKGROUND OF THE INVENTION

The present invention relates to a control device for activating an oxygen system of a means of transport, in particular an aircraft, a control system having such a control device, an associated method for activating an oxygen system of a means of transport, in particular an aircraft, and a computer program for carrying out the method. Furthermore, the present invention relates to a network for a means of transport, in particular for an aircraft.

Oxygen systems, such as oxygen emergency systems, serve in aircraft to supply the passengers reliably with oxygen e.g., during a pressure drop in the cabin.

In known oxygen systems, oxygen masks for the passengers are provided at various locations in an aircraft, such as above the passenger seats, in the toilets, at the stations of the flight crew and in the galley. The passengers may be supplied with oxygen in different ways. In an oxygen system often used, the oxygen for the passengers is produced by chemical oxygen generators. The oxygen generators are connected to the masks via flexible tubes. Alternatively to the use of oxygen generators, the oxygen may also be stored in oxygen cylinders and delivered as required.

Irrespective of how the oxygen supply to the passengers is ensured, the oxygen (emergency) system ((emergency) oxygen system) for example is activated manually, e.g., from the cockpit, or automatically, if the pressure in the cabin drops to a predetermined limit value (the limit value may, for example, be comparable to the pressure at 14000+0-500 ft altitude). The activation may, for example, be performed by a pressure switch. As soon as the automatic oxygen supply is activated, the paneling (covering) of the passengers' oxygen masks opens and the oxygen masks fall out. The space in which the oxygen masks for the passengers are stored is also referred to as an oxygen (mask) container. At the moment when the passengers have pulled the masks towards them, the oxygen supply is triggered, that is to say for example the oxygen generators are started. The paneling/covering of the oxygen containers or oxygen mask containers above the seats is normally kept closed by an electrical lock. As soon as the lock receives an electrical signal, it is released and the protective flap is opened, e.g., via a tensioned spring.

Conventional oxygen (emergency) systems are activated via an extensive wired cabling. In the normal state, i.e., when no activation of the oxygen system occurs, the cables are currentless and are regularly tested. To achieve a defined availability, generally a substantially greater number of cables are installed than would be necessary for simple activation. This means that the cabling is designed to be heavily redundant to guarantee the required availability.

Figure 1:
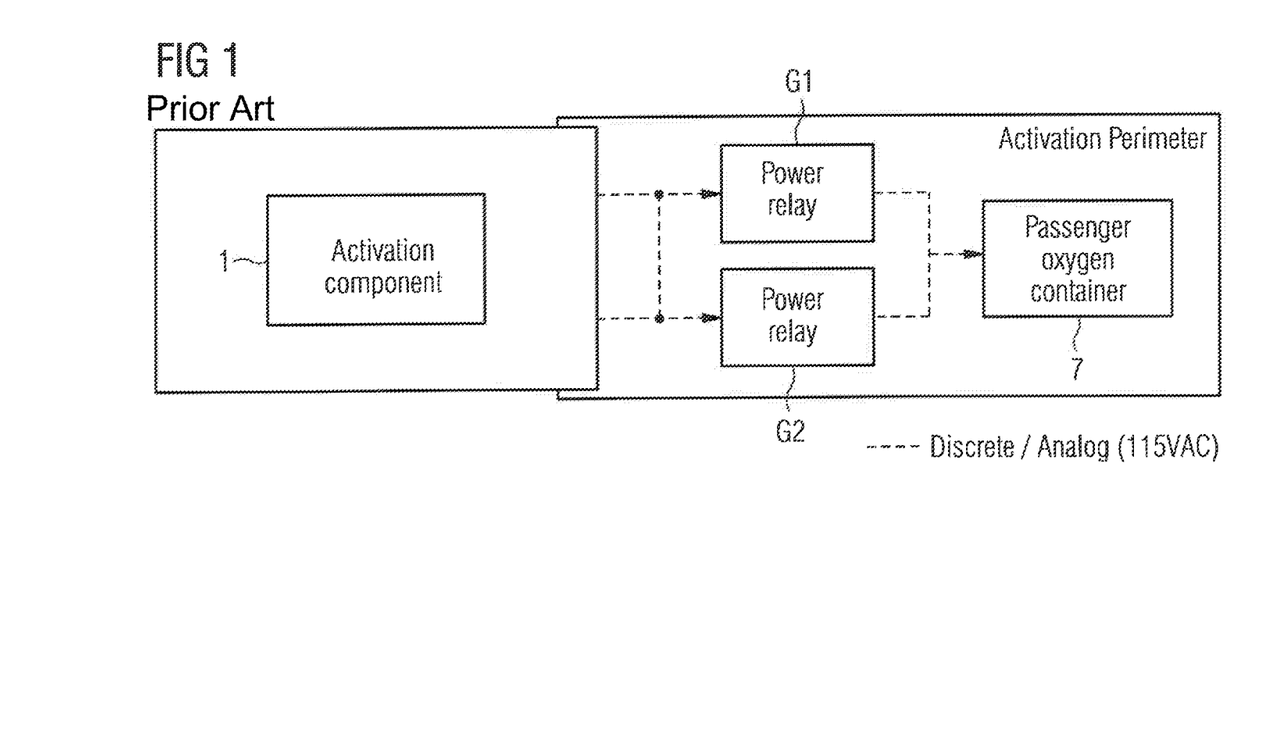
FIG. 1 shows a schematic representation of a conventional architecture for activating an oxygen system.

FIG. 1 shows schematically the conventional structure of a system for activating an oxygen system. If the oxygen system (e.g., when a pressure drop is detected) is to be activated, an activation signal is generated by an activation component 1. The activation signal is then passed on in a wired manner via the cables indicated schematically in FIG. 1 and the power relays G1, G2. As a result, the activation signal reaches the passenger oxygen container 7 purely in a wired manner, and the latter is then activated in reaction to the activation signal.

Independently of the conventional activation of oxygen systems described, DE 10 2009 009 189 A1 and WO 2010/092152 A1 disclose a sensor network in an aircraft, the sensor network having a plurality of sensor nodes. Such a sensor node comprises a sensor unit for acquiring measured values, an energy supply unit for supplying the sensor node with electrical energy and a transmitting and receiving unit for wirelessly transmitting the acquired preprocessed measured values to a central data collection and evaluation unit.

SUMMARY OF THE INVENTION

It is an object of the present invention to provide a control device and a method for activating an oxygen system of a means of transport, in particular an aircraft, a control system having such a control device, and a computer program for carrying out the method, by means of which a reliable activation of the oxygen system is ensured.

The control device according to the invention for activating an oxygen system (an oxygen supply) of a means of transport, in particular an aircraft, comprises a first activation unit which is configured to activate at least a part of the oxygen system by wireless transmission of a first activation signal.

The oxygen system may be formed in particular as an oxygen emergency system which can be triggered, for example, on detection of a pressure drop in the means of transport, in particular a cabin of an aircraft, or by manual instruction. The oxygen system may have one or more oxygen (mask) containers for passenger of the means of transport, in particular the aircraft. It is conceivable for the oxygen system to have a multiplicity of oxygen containers. The activation unit may be configured in this case to activate only a subset or all of the multiplicity of oxygen containers with the aid of the first activation signal.

In particular, the opening of a paneling or covering of the oxygen containers may be instructed with the aid of the first activation signal. For example, the first activation unit may instruct/trigger by means of the first activation signal an electrical lock, which keeps the paneling or covering closed, to open.

According to a first variant, the first activation unit may obtain, from sensors present in the means of transport, such as an aircraft, information about whether the oxygen (emergency) system is to be activated. The sensors may, for example, ascertain a pressure drop in the means of transport and inform the first activation unit about this. According to this first variant, the first activation unit may process the information obtained and for example determine which parts of the oxygen system, e.g., which subset of the oxygen containers, are to be activated. In particular, according to the first variant, the entire oxygen supply (e.g., all of the oxygen containers) may be triggered with the aid of the first activation signal.

According to a second variant, which, however, may be combined with the first variant, it is also conceivable for the first activation unit to act independently of inputs of the sensors. For example, according to the second variant, it is conceivable, e.g., for maintenance purposes, for the first activation unit to be tasked to activate only a part of the oxygen system, such as a subset of the oxygen containers. In this case, preferably the first activation signal is wirelessly transmitted by the first activation unit only to the part of the oxygen system, e.g., to the subset of the oxygen containers, which is to be activated. In this way, for example only the oxygen containers to be maintained may be triggered.

The control device may furthermore comprise a communication unit which is configured to transmit the first activation signal. According to a development, the communication unit may, however, not only comprise a transmitting unit (transmitter) (and an assigned transmitting antenna) for unidirectional transmission, but may alternatively also comprise a transmitting-receiving unit (transceiver) (and an assigned additional receiving antenna or a combined transmitting-receiving antenna) and thereby communicate bi-directionally, i.e., send and receive data. The receiving unit of the communication unit may furthermore be configured to obtain a state signal from the oxygen system. The state signal may contain a large number of items of state information about at least a part of the oxygen system.

For example, the state signal may include, as state information, information about the type of at least one oxygen container (or of a multiplicity of oxygen containers), information about the maintenance of the at least one oxygen container (or of the multiplicity of oxygen containers), information about the triggering state of the at least one oxygen container (or of the multiplicity of oxygen containers), information about the pressure of oxygen storages (e.g., oxygen tanks or oxygen cylinders) assigned to the at least one oxygen container (or the multiplicity of oxygen containers) (e.g., arranged therein) and/or information about the filling state of oxygen storages (e.g., oxygen tanks or oxygen cylinders) assigned to the at least one oxygen container (or the multiplicity of oxygen containers) (e.g., arranged therein).

All of these items of state information may be transmitted isolated from one another or combined as desired with one another. The type of oxygen container may be transmitted as state information with the aid of a Serial Number S/N or a Functional Identification Number (FIN) of the container. The maintenance information which may be transmitted as state information is, for example, information about the time (e.g., the date) of the last check or the last test of the oxygen container(s). Independently of this, it is possible to transmit as triggering state of the oxygen containers whether the covering or the lid of the oxygen container(s) is open or closed. Furthermore, the pressure in the oxygen cylinders may be determined and transmitted as part of the state information to the communication unit.

With the aid of the state information, it is possible, for example, to transmit to the communication unit which container (identified e.g., by its serial number) was last maintained at what time, the state it is in and/or the state of the oxygen cylinders present therein. The state information enables a targeted maintenance of a part of or the whole of the oxygen supply, such as individual or all of the oxygen containers. In particular, faults that exist may be efficiently determined and located.

In addition to the first activation unit, the control device may, according to a development, comprise a second activation unit. According to this development, the second activation unit is configured to activate at least a part of the oxygen system by wired transmission of a second activation signal. With the aid of the second activation unit, a combination of wireless and wired transmission may be achieved by the control device.

The second activation unit may furthermore be configured to supply at least a part of the oxygen system with electrical energy by wired transmission of an energy supply signal (or by providing transmittable energy). Both the second activation signal and the energy supply signal may be formed as a discrete signal. In this regard, both signals may each assume in particular two states, namely a low level (low), which is preferably at least approximately 0 volts, and a high level (high) with a voltage differing from 0 volts. For example, the high level of the activation signal may assume a voltage value between 25 volts and 35 volts, such as e.g., 28 volts. The high level of the energy supply signal may be, for example, between 5 volts and 15 volts, e.g., 10 volts. Irrespective of the exact values of the high levels of the second activation signal and of the energy supply signal, the high levels preferably each have different voltages, i.e., the voltage levels of the two signals are preferably different.

The second activation unit may be connectable, for example, to a supply channel of the means of transport, in particular the aircraft. It is thus conceivable for the second supply unit to be connected to current-carrying lines present in the supply channel, in order thereby to obtain the second activation signal and/or the energy supply signal. Alternatively, the second activation unit may be connected to an energy supply unit separated from the supply channel, in order to obtain from this unit energy for generating the second activation signal and/or the energy supply signal.

The control system according to the invention for activating an oxygen system of a means of transport, in particular an aircraft, comprises the control device, as is/has been described herein, and at least one communication module. The communication module(s) is/are preferably spatially separated from the control device. Irrespective of the exact number and position of the communication modules, each of the communication modules is connectable to the oxygen system and configured to wirelessly receive the first activation signal from the first activation unit and pass it on to the oxygen system to activate at least a part of the oxygen system.

For example, a communication module may be assigned to each subregion of the oxygen system or to each oxygen container. In other words, for example each communication module of a multiplicity of communication modules may be connected to an oxygen container. As a result, the control device may activate one, more than one or else all of the oxygen containers with the aid of the first activation signal by the first activation unit wirelessly transmitting the first activation signal to the communication module(s) connected to the oxygen containers to be activated. Thus, the first activation unit may wirelessly transmit the first activation signal, for example, only to the oxygen containers which are to be activated. The oxygen containers which are not to be activated, by contrast, do not receive a first activation signal.

It is conceivable that the at least one communication module may establish a bidirectional communication connection to the first activation unit and thus has both a transmitting and a receiving unit. To this end, the communication module may comprise a transmitting antenna assigned to the transmitting unit, a receiving antenna assigned to the receiving unit, or an antenna which can both transmit and receive and is thus assigned both to the transmitting and the receiving unit. With the aid of the transmitting unit, the at least one communication module may transmit the state signal containing the state information to the first activation unit. The at least one communication module may, for example, itself obtain the state information about the oxygen system and transmit it to the first activation unit. Alternatively, the state information may also be supplied to the at least one communication module from outside. It is conceivable for the first activation unit firstly to inform the at least one communication module what state information it requires. The requested state information may then be ascertained or obtained by the at least one communication module and transmitted to the first activation unit. Furthermore, it is also possible for the at least one communication module to transmit state information to the first activation unit periodically, e.g., at continuous or varying time intervals.

The control system may furthermore comprise an information collecting unit. The information collecting unit may be connected in particular to the first activation unit e.g., wirelessly or in a wired manner and configured to obtain the state information from the first activation unit and store it. The state information stored in the information collecting unit may then be evaluated by the information collecting unit itself or the control device, for example for maintenance purposes. If, for example, it is detected that the filling state of one or more of the oxygen cylinders is no longer sufficiently high, these oxygen cylinders may be exchanged. It is also possible, for example with the aid of the serial numbers and the triggering state of the oxygen containers, to ascertain whether and which oxygen container assumes an incorrect triggering state, such as, for example, is incorrectly in a triggered state.

The control system may furthermore comprise at least one energy storage which is connectable to the at least one communication module and configured to supply the communication module(s) with electrical energy. Additionally or alternatively to this, the energy storage may be configured to provide energy to activate at least a part of the oxygen system. For example, each energy storage of a multiplicity of energy storages present may be assigned to an oxygen container and configured to provide energy for the oxygen container, in particular for the electronics of the oxygen container.

According to a first realization, the energy storage may comprise a battery or be configured as such. Alternatively to this, the energy storage may comprise an energy buffer (energy temporary storage), in particular an accumulator or a capacitor, for storing the electrical energy or be configured as such. The energy buffer may be charged with electrical energy, for example, with the aid of the energy supply signal transmitted by the second activation unit or energy provided by the second activation unit. If a capacitor is used as energy buffer or if a capacitor is contained in the energy buffer, then the capacitor may be configured, for example, as a double-layer capacitor, as a super- or ultra-capacitor or as a hybrid capacitor. Specifically, a so-called super cap may be used as the super-capacitor.

The method according to the invention for activating an oxygen system of a means of transport, in particular an aircraft, comprises at least the step of activating at least a part of the oxygen system by wireless transmission of a first activation signal.

Furthermore, the invention relates to a computer program having program code means, which program, when it is loaded into a computer or a processor (for example a microprocessor or microcontroller) or runs on a computer or processor, causes the computer or processor (e.g., the microprocessor or microcontroller) to carry out the method described above. In addition, the invention relates to a program storage medium or computer program product having the said computer program.

Although some of the above-described aspects have been described in relation to the control device and the control system, these aspects may also be implemented as methods or as a computer program which carries out the method. Equally, aspects described in relation to the method may be realized by suitable units in the control device and the control system or be carried out by the computer program.

According to a further aspect of the invention, a network for a means of transport, in particular for an aircraft, is provided. The network comprises a multiplicity of network nodes, a first of the multiplicity of network nodes being connected to a second of the multiplicity of network nodes via a wired connection, and the first of the multiplicity of network nodes being connected to a third and/or the second of the multiplicity of network nodes via a wireless connection. In this way, for example, two or more network nodes may each be connected to one another both via a wired and a wireless connection. It is also possible to connect a multiplicity of network nodes of the same kind (for example components of the same kind) to another network node (for example a device belonging to the components), a part of the connections being realized wirelessly and another part of the connections being realized in a wired manner. In particular, a majority of the connections to the other network nodes may be of wireless design.

BRIEF DESCRIPTION OF THE DRAWINGS

Preferred embodiments of the present invention are explained below with reference to the appended schematic figures, in which.

DETAILED DESCRIPTION OF THE PREFERRED EMBODIMENTS

Figure 2:
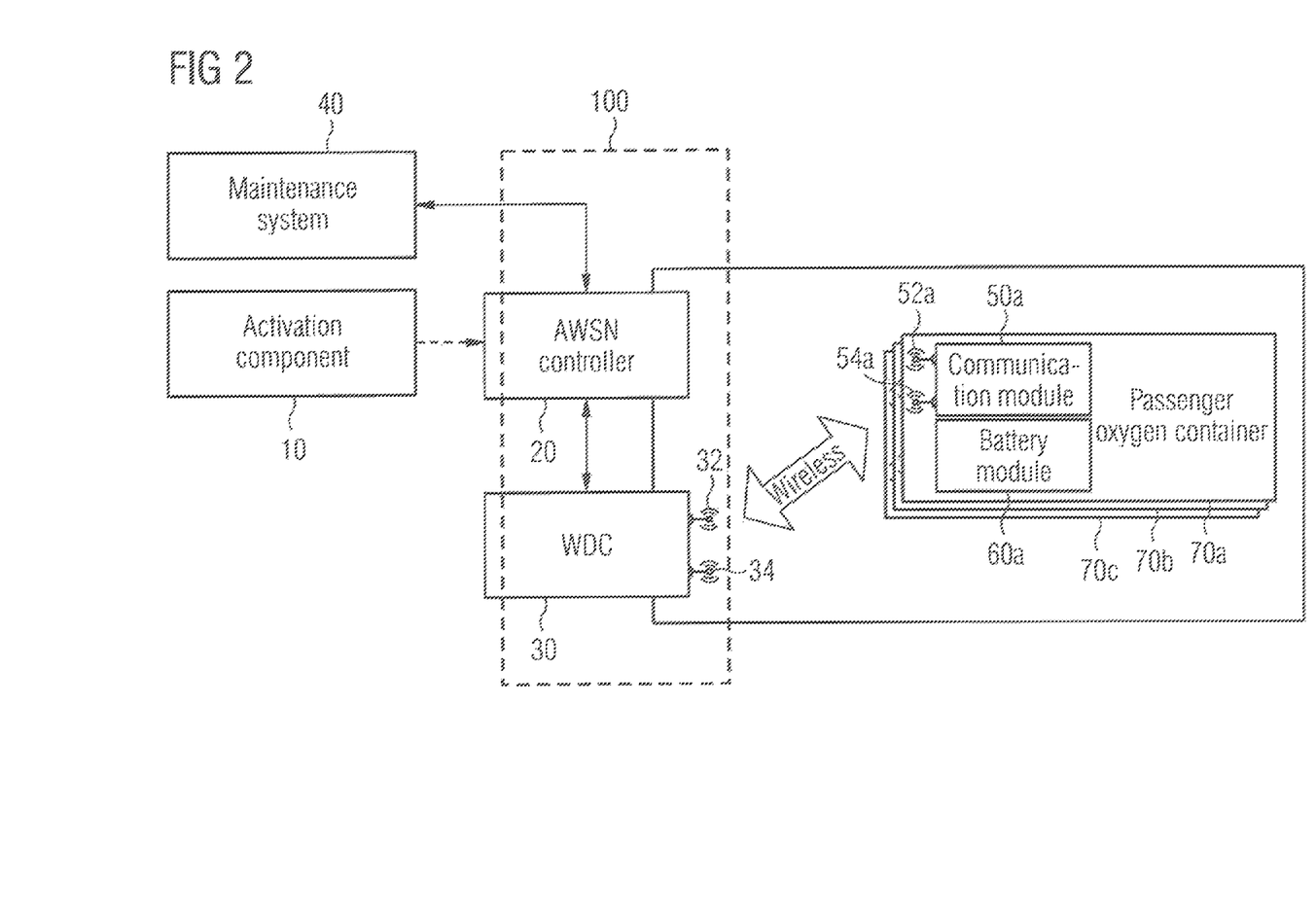
FIG. 2 shows a schematic representation of an architecture according to a first embodiment for activating an oxygen system.
Figure 3:
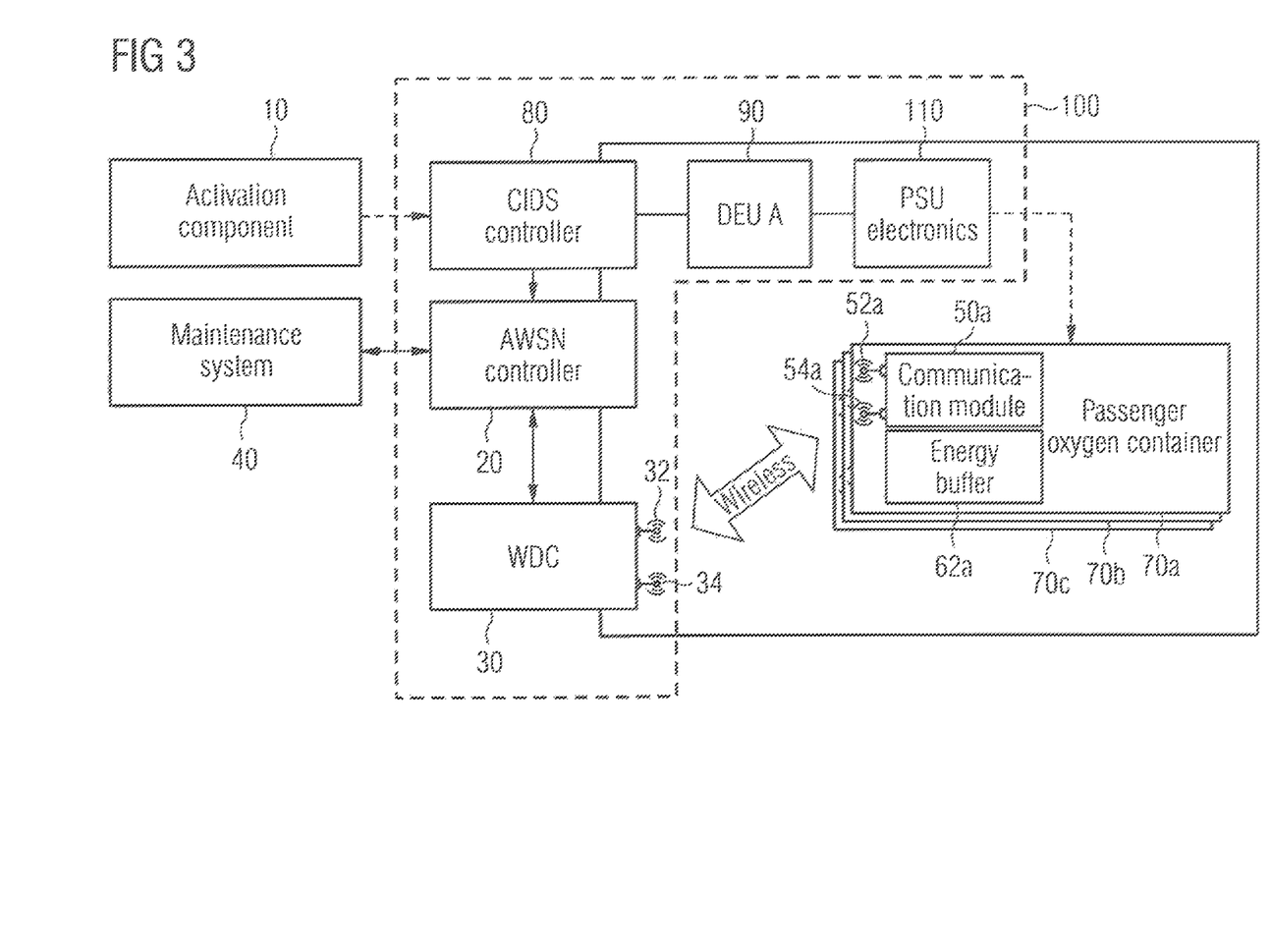
FIG. 3 shows a schematic representation of an architecture according to a second embodiment for activating an oxygen system.
Figure 4:
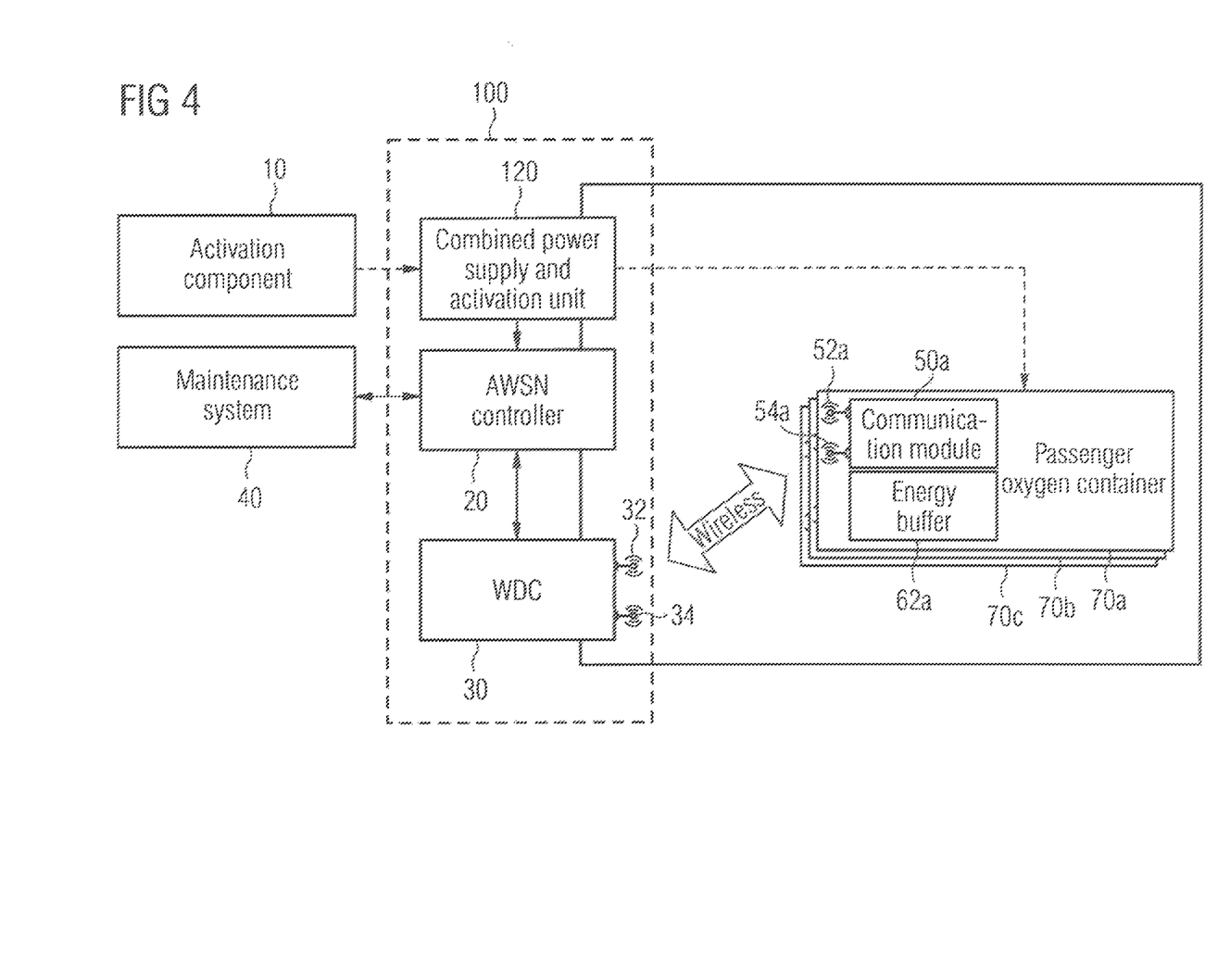
FIG. 4 shows a schematic representation of an architecture according to a third embodiment for activating an oxygen system.

By way of example, it is assumed in the following that the oxygen systems to be activated/controlled in FIGS. 2 to 4 are oxygen systems of an aircraft. The oxygen systems are, however, not restricted thereto.

FIG. 2 shows a control system according to a first embodiment for activating an oxygen system of an aircraft. In the first embodiment, the activation of the oxygen system operates purely wirelessly.

The control system comprises a control device 100 which in FIG. 2 has a sensor network controller configured, by way of example, as an Avionic Wireless Sensor Network (AWSN) controller 20 and a Wireless Data Concentrator (WDC) 30 as access point. The WDC 30 has a transmitting antenna 32 and a receiving antenna 34, but may also have a combined transmitting-receiving antenna instead of these two antennas. Furthermore, the control system from FIG. 2 comprises an activation component 10 for activating the control device 100 and an information collecting unit, which is configured as a maintenance system 40 in FIG. 2.

The control system shown in FIG. 2 serves to control an oxygen (emergency) system (oxygen supply system) which comprises a multiplicity of oxygen containers 70a, 70b, 70c for the passengers of the aircraft. In FIG. 2, by way of example, three oxygen containers 70a, 70b, 70c are shown.

This number is, however, merely to be understood as an example, and any plurality of oxygen containers may be present in the oxygen system. Furthermore, in FIG. 2 it can be seen schematically that a communication module 50a and a battery module 60a, which serves as an energy storage, are assigned to each oxygen container 70a, 70b, 70c (for presentation reasons, only the communication module 50a and battery module 60a assigned to the first oxygen container 70a is shown). It is, however, also conceivable to assign a communication module and a battery module to more than one oxygen container, for example two, three, four or more than four oxygen containers. As can furthermore be seen schematically in FIG. 2, each communication module 50a has two antennas, namely a transmitting antenna 52a and a receiving antenna 54a (for presentation reasons, only the transmitting antenna 52a and the receiving antenna 54a of the communication module 50a is shown). Instead of these two antennas 52a 54a, each communication module 50a may also have a combined transmitting-receiving antenna.

If, for example, a pressure drop in the aircraft is detected by the activation component 10, then the activation component 10 activates the control device 100 and in particular the AWSN controller 20. The activation component 10 may, for example, be sensors present in the aircraft which, according to a concrete embodiment, can detect the pressure drop. The activation component is, however, not restricted to sensors or pressure sensors specifically, but embodies any instruction (e.g., also a manual instruction) to the control device 100 and to the control system to activate the oxygen system.

In reaction to the instruction by the activation component 10, the AWSN controller 20 controls the WDC 30 in such a manner that the latter transmits a first activation signal wirelessly, with the aid of the transmitting antenna 32, at least to the receiving antenna 54a of the communication module 50a. Additionally, the WDC 30 may also transmit the first activation signal wirelessly to the receiving antennas of the further communication modules 50a. The control function as regards the communication modules 50a to which the first activation signal is to be transmitted is performed by the AWSN controller 20. The latter instructs the WDC 30 as regards the communication modules 50a to which the first activation signal is to be wirelessly transmitted.

The first activation signal is generated, according to the embodiment shown in FIG. 2, in the AWSN controller 20 and then emitted by the WDC 30 via its transmitting antenna 32. In this respect, the embodiment may be understood in such a way that the AWSN controller 20 comprises a first activation unit for generating a first activation signal (or is configured as such) and the WDC 30 comprises a communication unit for the wireless transmission of the first activation signal (or is configured as such).

The AWSN controller 20 can, for example, instruct the WDC 30 to transmit the first activation signal to the communication modules 50a of all the oxygen containers 70a, 70b, 70c. For this purpose, the transmitting antenna 32 of the WDC 30 transmits the first activation signal to each receiving antenna, i.e., inter alia the receiving antenna 54a of the communication module 50a. Thereupon, the communication module 50a and the further communication modules (not shown) ensure that the oxygen containers 70a, 70b, 70c assigned to them are activated. For the activation of the oxygen container 70a, the battery module 60a provides sufficient power. The same applies analogously to the battery modules (not shown) of the further oxygen containers 70b, 70c.

Alternatively, it is also conceivable that a check is to be carried out on only a subset of the oxygen containers 70a, 70b, 70c, for example the oxygen container 70a. In this case, the AWSN controller 20 instructs the WDC 30 to transmit the first activation signal, via its transmitting antenna 32, only to the receiving antenna 54a of the communication module 50a. In reaction to the reception of the first activation signal, the communication module 50a causes only the oxygen container 70a assigned to it to be activated. For this purpose, the battery module 60a provides sufficient power.

The control system furthermore enables state information about the state of the oxygen containers 70a, 70b, 70c to be obtained. For this purpose, the AWSN controller 20 can instruct the WDC 30 to retrieve the state information of a subset or all of the oxygen containers 70a, 70b, 70c. It is also possible for a subset or all of the oxygen containers 70a, 70b, 70c periodically to transmit the state information via their assigned communication module to the WDC 30, which then passes on the state information to the AWSN controller 20. The AWSN controller 20 in turn passes on the state information to the maintenance system 40, which then stores the state information. The state information can be read out or retrieved by the AWSN controller 20 at a later time, at option. The state information can contain information about the type of the oxygen containers 70a, 70b, 70c, the last check of the oxygen containers 70a, 70b, 70c, or the pressure or filling level of oxygen cylinders assigned to the oxygen containers 70a, 70b, 70c. Other information about the oxygen containers 70a, 70b, 70c is also conceivable as state information. Thus, it is also possible to retrieve the triggering state of the oxygen containers 70a, 70b, 70c, e.g., whether the covering/lid of the oxygen containers 70a, 70b, 70c is open or closed.

FIG. 3 shows a control system according to a second embodiment. The second embodiment works with a combination of wireless and wired activation. The components provided with the same reference symbols as in FIG. 2 correspond to those from FIG. 2. Reference is made to the above description with respect to the components already described in relation to FIG. 2.

As can be seen in FIG. 3, the control device 100 comprises, in addition to the AWSN controller 20 and the WDC 30, a controller for an internal communication and data system (Cabin Intercommunication and Data System (CIDS)) 80, a Decoder Encoder Unit (DEU) type A 90 and an electronic unit of a supply channel (Passenger Supply Unit (PSU)) 110. Furthermore, instead of the battery module 60a as energy storage, an energy buffer (energy temporary storage) 62a is used for each oxygen container 70a, 70b, 70c.

The CIDS is a monitoring system for the cabin of the aircraft. With the CIDS it is possible to control, monitor and test numerous cabin systems, such as, for example, announcements to passengers, the internal communication of the flight crew, illuminated warning and information signs, the general cabin lighting, the toilet smoke alarm system, the lighting of the escape routes, pressure vessels of the escape chutes, and entertainment systems (video, music etc.). The CIDS is an adaptable system and can be present or installed in any type of aircraft.

The central processing unit (central computer) of the CIDS forms the so-called director, which is designated as CIDS controller 80 in FIG. 3. Furthermore, the CIDS has, inter alia, so-called Decoder Encoder Units (DEUs), of which a DEU type A (reference symbol 90) is shown in FIG. 3. All the output signals of the above-mentioned cabin systems and of the CIDS components are received by the director, the CIDS controller 80. The communication between the director, the CIDS controller 80, and the cabin systems takes place via the DEUs type A and B mentioned. The DEUs type A 90 form the interface between the director (the CIDS controller 80) and the systems relevant to the passengers (the DEUs type B form the interface between the director and the systems relevant to the cabin crew). A DEU A can supply a plurality of, e.g., up to three, passenger seats. The DEUs A 90 are installed above the seats along the entire cabin and all lead, via cable connections, to the director (the CIDS controller 80), which is usually situated in the nose of the aircraft in the avionics area.

According to FIG. 3, the control device 100 is again activated by the activation component 10. The activation component 10 indicates to the CIDS controller 80 that an activation of the oxygen containers 70a, 70b, 70c is to take place. The CIDS controller 80 then instructs the AWSN controller 20 accordingly to wirelessly activate the oxygen containers 70a, 70b, 70c, as described above in relation to FIG. 2.

In addition, a wired activation of the oxygen containers 70a, 70b, 70c is carried out, via the cabin systems present, by the CIDS controller 80 via the DEU A 90 to the PSU electronics 110. The communication between the CIDS controller 80 and the cabin systems takes place via the DEU A 90. Via the latter, the PSU electronics 110 are instructed to generate a second activation signal. For this purpose, the PSU electronics 110 are in wired connection, via precisely one cabling, to the oxygen system, such as, for example, one or more of the oxygen containers 70a, 70b, 70c (e.g., to each oxygen container 70a, 70b, 70c). Via these connections, the PSU electronics 110 transmit the second activation signal in a wired manner to the oxygen containers 70a, 70b, 70c. Additionally, the PSU electronics 110 provide energy for supplying the oxygen container electronics. The energy provided may be very small, since the energy buffers (energy temporary storages) 62a are integrated in the containers 70a, 70b, 70c. Both the activation signal and the energy supply signal are formed as discrete signals with a low level (low) of almost 0 volts and a high level (high) differing from 0 volts. For the high level, different voltages are chosen for the energy supply signal and the second activation signal. By way of example, according to the embodiment shown, a voltage of 10 volts is chosen for the energy supply signal and a voltage of 28 volts for the second activation signal, so that the oxygen containers 70a, 70b, 70c, more precisely their electronics, can differentiate between the two signals. The voltages may be obtained from the voltage of the service bus, with which the CIDS is also supplied. In particular, the voltage of the service bus of 28 volts can then be used directly for the second activation signal.

FIG. 4 shows a control system according to a third embodiment. The third embodiment also combines a wireless and wired activation. The components provided with the same reference symbols as in FIGS. 2 and 3 correspond to those from FIGS. 2 and 3. Reference is made to the above description with respect to the components already described in relation to FIGS. 2 and 3.

In addition to the embodiment shown in FIG. 2, the control device 100 according to FIG. 4 has a combined power supply and activation unit 120 (referred to hereinbelow as power supply unit 120 for short), which is connected to one or more (for example all) of the oxygen containers 70a, 70b, 70c. As described in relation to FIGS. 2 and 3, in reaction to an activation by the activation component 10, the AWSN controller 20 will instruct the WDC 30 to transmit the first activation signal wirelessly to one or more of the communication modules 50a of the oxygen containers 70a, 70b, 70c. Furthermore, a second activation signal is transmitted via the power supply unit 120 in a wired manner to the oxygen containers 70a, 70b, 70c connected to the power supply unit 120. According to FIG. 4, the second activation signal used is transmitted via a discrete (additional) cabling. The cabling is permanently supplied with a low current, in order to keep the energy temporary storage 62a in the oxygen containers (the oxygen container electronics) 70a, 70b, 70c filled. At the same time, owing to the continuously flowing, albeit low, current) the cables can be monitored, e.g., continuously, for correct functioning. The cables can have a very small cross-section. In addition to the second activation signal, the energy supply signal is transmitted to supply the energy temporary storage 62a with energy, as described in relation to FIG. 3. The power supply unit 120 is responsible for this too, i.e., it serves to transmit the second activation signal and to provide and transmit the energy supply signal.

Figure 5:
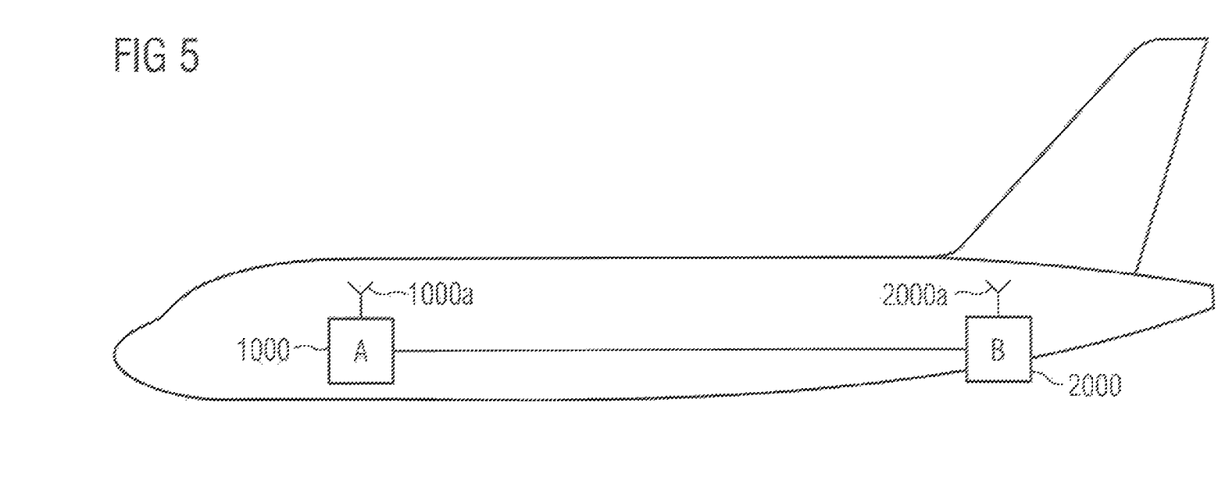
FIG. 5 shows a schematic representation of a network according to a first embodiment.

FIG. 5 shows schematically a network in an aircraft. The network comprises a plurality of network nodes, only two network nodes 1000, 2000 being shown, by way of example. The network nodes 1000, 2000 are connected to one another via a wired cable connection and also by a wireless connection via antennas 1000a, 2000a arranged at the network nodes 1000, 2000. If the wired connection fails, then the wireless connection can continue to be used. Conversely, if the wireless connection fails, the wired connection can still be used.

Figure 6:
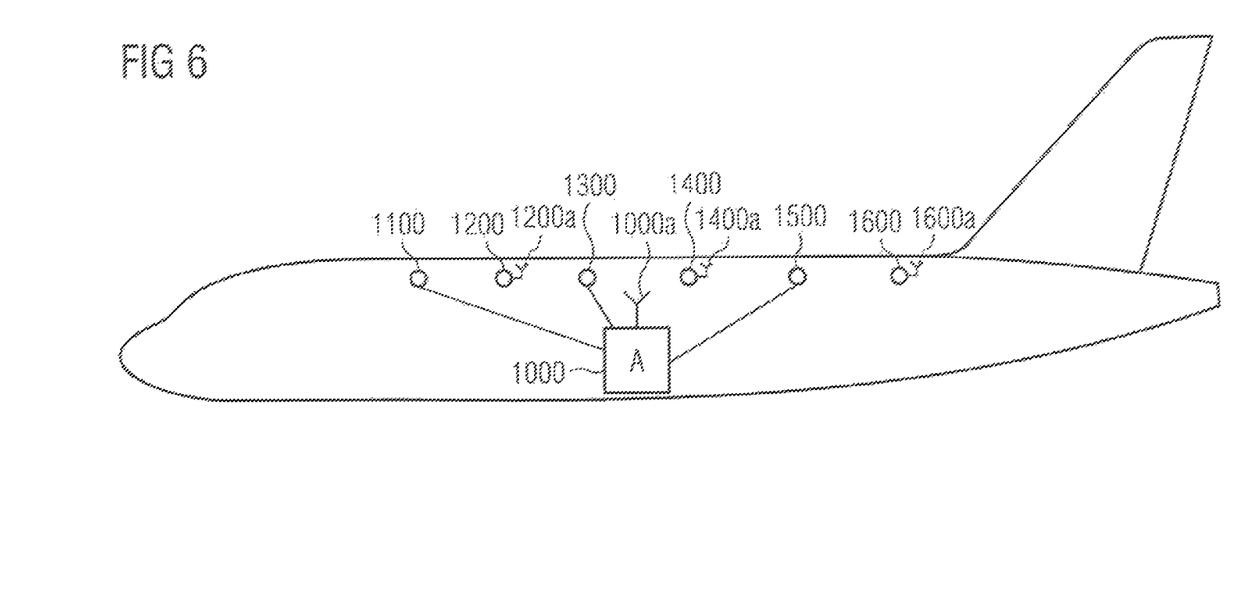
FIG. 6 shows a schematic representation of a network according to a second embodiment.

FIG. 6 shows a network according to a second embodiment. Present in the network is a network node 1000 at which several components of the same kind 1100, 1200, 1300, 1400, 1500, 1600 are each individually connected to the network node 1000. By way of example, it is assumed hereinbelow that the components 1100 to 1600 are temperature sensors which pass on their measured values to a data aggregator (the network node 1000). The network is, however, not restricted to this specific embodiment. As can be seen in FIG. 6, a subset of the temperature sensors 1100, 1300, 1500 are connected in a wired manner to the data aggregator 1000. Another subset of the temperature sensors 1200, 1400, 1600 are connected (with the aid of their antennas 1200a, 1400a, 1600a), via a wireless connection, to the data aggregator 1000 (in particular its antenna 1000a). In FIG. 6, the same number of temperature sensors are connected wirelessly and in a wired manner to the data aggregator 1000. In particular, a majority of the temperature sensors may, however, also be connected wirelessly to the data aggregator 1000.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A control device for activating an oxygen system of a means of transport, the control device comprising:
   a first activation unit which is configured to activate at least a part of the oxygen system by wireless transmission of a first activation signal;
   a second activation unit which is configured to activate said at least part of the oxygen system by wired transmission of a second activation signal; and
   a controller is configured to send an activation instruction to the first activation unit and the second activation unit;
   wherein, upon the controller sending an activation instruction the first activation unit and the second activation unit, the first activation signal and the second activation signal are transmitted to said at least part of the oxygen system.

2. The control device according to claim 1, the control device further comprising a communication unit for transmitting the first activation signal, the communication unit further being configured to obtain a state signal from the oxygen system, the state signal containing state information about at least a part of the oxygen system.

3. The control device according to claim 2, wherein the oxygen system comprises at least one oxygen container and the state information including at least one of information about the type of the at least one oxygen container, information about the maintenance of the at least one oxygen container, information about the triggering state of the at least one oxygen container, information about the pressure of oxygen storages assigned to the at least one oxygen container and information about the filling state of oxygen storages assigned to the at least one oxygen container.

4. The control device according to claim 1, wherein the second activation unit is connected to a supply channel of the means of transport.

5. The control device according to claim 1, wherein the second activation unit further is configured to supply at least a part of the oxygen system with electrical energy by wired transmission of an energy supply signal, the second activation signal and the energy supply signal each being formed as a discrete signal with different voltages.

6. A control system for activating an oxygen system of a means of transport, comprising:
   the control device according to claim 1; and
   at least one communication module which is connectable to the oxygen system and configured to wirelessly receive the first activation signal and pass it on to the oxygen system to activate at least a part of the oxygen system.

7. The control system according to claim 6, the control system further comprising at least one energy storage which is at least one of connectable to the communication module and configured to supply the communication module with electrical energy, and configured to provide energy to activate at least a part of the oxygen system.

8. The control system according to claim 7, the energy storage comprising at least one of a battery and an energy buffer, for storing the electrical energy, the energy buffer being chargeable with electrical energy with the aid of the energy supply signal.

9. The control system according to claim 8, wherein the energy buffer is one of an accumulator and a capacitor.

10. The control system according to claim 6, wherein the communication module further is configured to transmit the state signal containing the state information to the first activation unit.

11. The control system according to claim 10, the control system further comprising an information collecting unit which is connected to the first activation unit and configured to obtain the state information from the first activation unit and store it.

12. A method for activating an oxygen system of a means of transport, the method comprising at least the following step:
   generating an activation instruction;
   activating at least a part of the oxygen system by wireless transmission of a first activation signal in response to the activation instruction; and
   activating the same at least part of the oxygen system by wired transmission of a second activation signal in response to the activation instruction.

13. A computer program having program code means, which program, when it is loaded into a computer or a processor or runs on a computer or processor, causes the computer or processor to carry out a method according to claim 12.

14. A program storage medium or computer program product having the computer program according to claim 13.

15. A network for a means of transport having a multiplicity of network nodes, a first of the multiplicity of network nodes being connected to a second of the multiplicity of network nodes via a wired connection, and the first of the multiplicity of network nodes being connected to the second of the multiplicity of network nodes via a wireless connection;
   wherein an activation instruction is sent from the first node to the second node of the multiplicity of network nodes via the wired connection and via the wireless connection.

* * * * *